United States Patent [19]
Kelly et al.

[11] Patent Number: 5,163,821
[45] Date of Patent: Nov. 17, 1992

[54] SOLAR THERMAL POWERED WATER PUMP

[75] Inventors: Quentin T. Kelly, Hopewell; Steve M. Slaby, Princeton, both of N.J.; David T. Harrje, Coupeville, Wash.; Tony J. Poli, Hamilton Square, N.J.; Stefan C. Slaby, New Hope, Pa.; D. Michael H. Platt, Corning, N.Y.; John H. Fernandes, Tiverton, R.I.

[73] Assignee: WorldWater, Inc., Hopewell, N.J.

[21] Appl. No.: 678,640

[22] Filed: Apr. 2, 1991

[51] Int. Cl.⁵ .......................... F04B 17/00; F24J 3/02
[52] U.S. Cl. .................. 417/379; 60/641.8; 126/443
[58] Field of Search ............ 417/379; 60/641.08; 126/143

[56] References Cited

U.S. PATENT DOCUMENTS

| | | | |
|---|---|---|---|
| 1,785,651 | 12/1930 | Romagnoli | 60/641.8 |
| 4,016,860 | 4/1977 | Moan | 126/270 |
| 4,164,166 | 8/1979 | Stubbs | 91/342 |
| 4,227,866 | 10/1980 | Stubbs | 417/379 |
| 4,346,694 | 8/1982 | Moan | 126/443 |
| 4,666,376 | 5/1987 | Solomon | 60/641.8 |
| 4,765,144 | 8/1988 | Spacer | 417/379 |

FOREIGN PATENT DOCUMENTS 2854609 6/1980 Fed. Rep. of Germany ..... 60/641.8

*Primary Examiner*—Richard A. Bertsch
*Assistant Examiner*—Peter Korytnyk
*Attorney, Agent, or Firm*—Henry P. Sartorio

[57] ABSTRACT

A solar powered water pump combines an evacuated tubular solar collector array for heating air with a diaphragm type pump by providing an internal heat exchanger in the manifold of the collector array. The heat exchanger uses heat from the heated air to generate steam from water. The steam from the heat exchanger is used to drive the diaphragm pump. Another heat exchange medium such as freon or ammonia can be used in place of water.

10 Claims, 8 Drawing Sheets

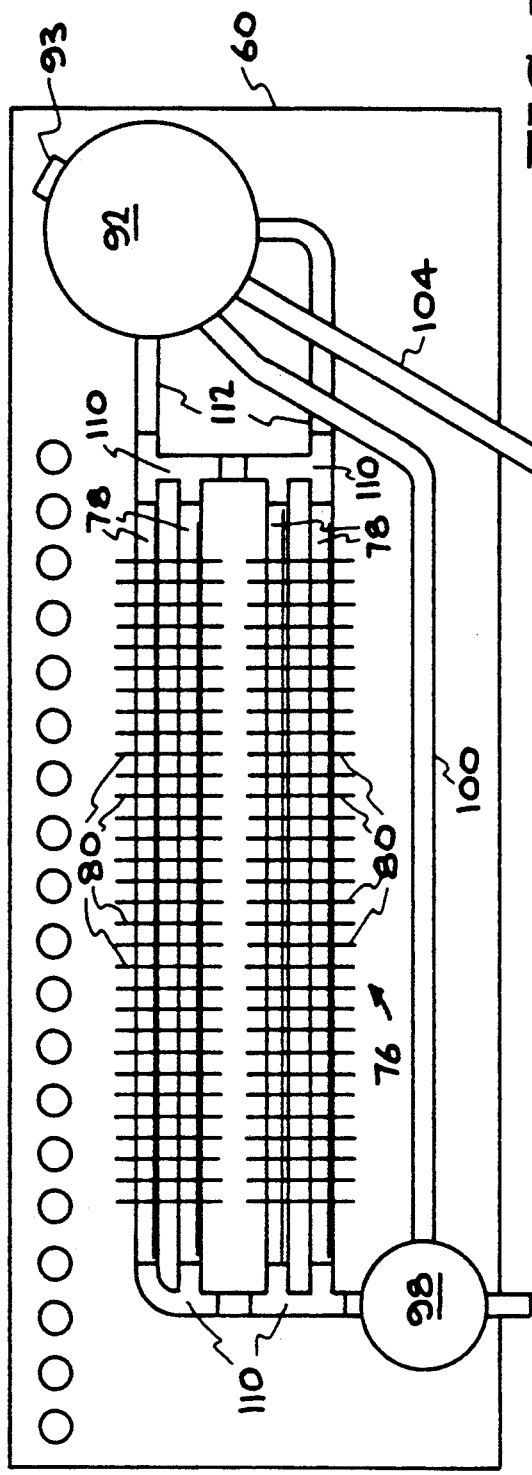
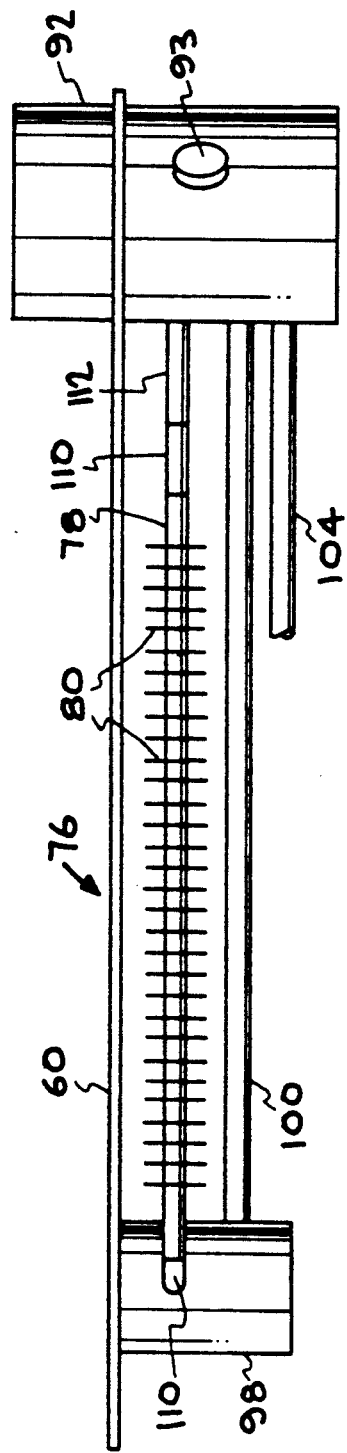
FIG. 5A
FIG. 5B

SOLAR THERMAL POWERED WATER PUMP

BACKGROUND OF THE INVENTION

The invention relates generally to water pumps and more particularly to water pumps powered by solar energy.

Water, not oil, is the most precious commodity in some parts of the world today and will be in the future. Water shortages present a critical problem. Contamination of the water supply is almost as serious. To solve these problems requires adequate supplies of water of sufficient purity to drink, to use industrially, and to irrigate agricultural lands without contaminating the resulting food chain.

Unfortunately, in many developing countries, particularly in parts of Africa and Asia, where millions of people have faced and continue to face famine caused by drought conditions or severe population overcrowding, sufficient ground or clean surface water is present to alleviate the problem. However, these people lack the means to recover this water. Thus millions die while water is within reach. It would be desirable to have high efficiency, low cost water pumps available so that each village or local area, including the peri-urban "squatter" communities surrounding many cities, could become self sufficient in water. A water pump which can irrigate 5 acres of land or supply the water needs of villages or groups of up to 2500 people would be particularly useful.

A wide variety of water pumps are available, including diesel, electric, mechanical, solar-electric (photovoltaic), and hand pumps. However, none of these offer an optimal combination of low cost, low maintenance and operation, and high water volume. In many undeveloped areas electrical power lines do not exist. Windmills are expensive and limited to having relatively constant high wind. A diesel system requires a supply of fuel. The estimated cost over 20 years for a diesel pump to supply a village of 2500 people is almost $40K. A photovoltaic solar (solar-electric) system includes solar cells, an electric motor, and a rotary pump, each of which is a high cost, high maintenance item. The estimated cost over 20 years for a photovoltaic powered pump to supply a village of 2500 people is greater than $30K. The simplest type of pump is of course a hand pump. However, a hand pump is very labor intensive, diverting manpower from other productive tasks, and only provides about 5% of the required volume. Thus, all the presently available pump systems have severe deficiencies which impair their suitability for large scale deployment in poor undeveloped parts of the world where they are most urgently needed.

The ideal pumping system would cost $10K or less over 20 years, or about $1.37/day, to supply a group of 2500 people, or about $0.20/person/year. The pump should be able to provide 7,000 to 16,000 gallons daily, enough generally to irrigate 5 acres, or supply 2500 people. The pump should be low power, e.g. less than 1 HP, and high efficiency.

Sunlight is plentiful in most areas of the earth, with up to 10 useful hours of sun in the warmer latitudes. A self-contained pump which requires no power source other than the sun, and which converts the sun's heat directly to physical power (as opposed to converting light to electricity through the usual solar-photovoltaic process) is highly desirable. Unfortunately, such a pump, which is particularly suitable for remote and undeveloped areas, has not been heretofore available.

U.S. Pat. No. 4,346,694 issued Aug. 31, 1982 to Moan describes a solar collector module for heating air or other gaseous heat recovery medium. A plurality of evacuated collector elements are disposed on opposite faces of a manifold in a staggered array. A central baffle divides the baffle into two parallel passageways through which the air is supplied to and removed from the collector elements. Each collector element is an elongated double wall glass tube with one open end, having the annular space between the double walls evacuated to a high vacuum. The inner wall also includes a solar energy absorbing surface. A metal distributor tube is coaxially disposed in a spaced relation within the inner wall of the collector element. The annular space between the distributor tube and the inner wall communicates with the proximate passageway of the manifold and the interior of the distributor tube communicates with the distant passageway. Thus, in the collector tubes mounted on the inlet passageway side of the manifold, the air flow is outward from the inlet passageway through the annular space and back through the distributor tube to the outlet passageway, while in the collector tubes on the outlet Passageway side, the air flow is reversed, outward from the inlet passageway through the distributor tube and back through the annular space to the outlet passageway. Thus colder air from the inlet passageway is heated by passage through the collector tubes and the heated air flows into the outlet passageway. The heated air is used in an external heat recovery system.

U.S. Pat. No. 4,016,860 issued Apr. 12, 1977 to Moan shows an alternative tubular solar energy collector design using air media. The manifold is split into separate chambers by a dividing wall. Each solar collector tube is divided in half by a divider strip. Each half of the collector tube communicates with one of the separate manifold chambers. The heated air is carried by external ducts to pass over external heat exchanger coils.

Air operated diaphragm pumps, e.g. as described in *The Chemical Engineer*, Dec. 13, 1990, pp. 34–38, are low cost, low maintenance, high efficiency pumps, with long operational lifetimes. Such diaphragm pumps have desirable characteristics for use in the aforementioned environments. However, the necessary compressed air supply would not generally be available. Unfortunately the heated air from the above-described solar collectors is not at sufficient pressure to operate a diaphragm pump. In a double diaphragm pump, two pumping chambers are each divided into two parts by a flexible diaphragm. The liquid to be pumped is on one side of the diaphragm, with compressed air on the other side. Since compressed air is applied directly to the liquid column separated by high temperature resistant elastomer diaphragms, this balanced load removes mechanical stress from the diaphragms to produce long life.

SUMMARY OF THE INVENTION

Accordingly it is an object of the invention to provide a low cost, high efficiency solar powered water pump.

It is another object of the invention to provide a solar powered water pump which converts the sun's heat directly to mechanical power to drive the pump.

It is also an object of the invention to provide a solar powered water pump which uses an array of tubular collector elements to heat air.

It is a further object of the invention to provide a solar powered water pump which uses a diaphragm type pump.

It is another object of the invention to provide a solar powered water pump which can pump 7,000 to 16,000 gallons daily, and irrigate 5 acres, or supply 2500 people.

It is also an object of the invention to provide a solar powered water pump which has a cost over 20 years of operation which is much lower than the cost of a diesel powered or photovoltaic powered water pump.

The invention is a solar powered water pump which combines a vacuum insulated tubular solar collector array for heating air with a diaphragm type pump by providing an internal heat exchanger in the manifold of the collector array. The heat exchanger uses heat from the heated air to generate steam from water. The steam from the heat exchanger is used to drive the diaphragm pump. In an alternative embodiment, another heat exchange medium such as freon or ammonia can be used in place of water.

BRIEF DESCRIPTION OF THE DRAWINGS

In the accompanying drawings:

FIG. 3 B illustrates air flow through an alternative three chamber manifold.

DETAILED DESCRIPTION OF THE PREFERRED EMBODIMENTS

Figure 1:
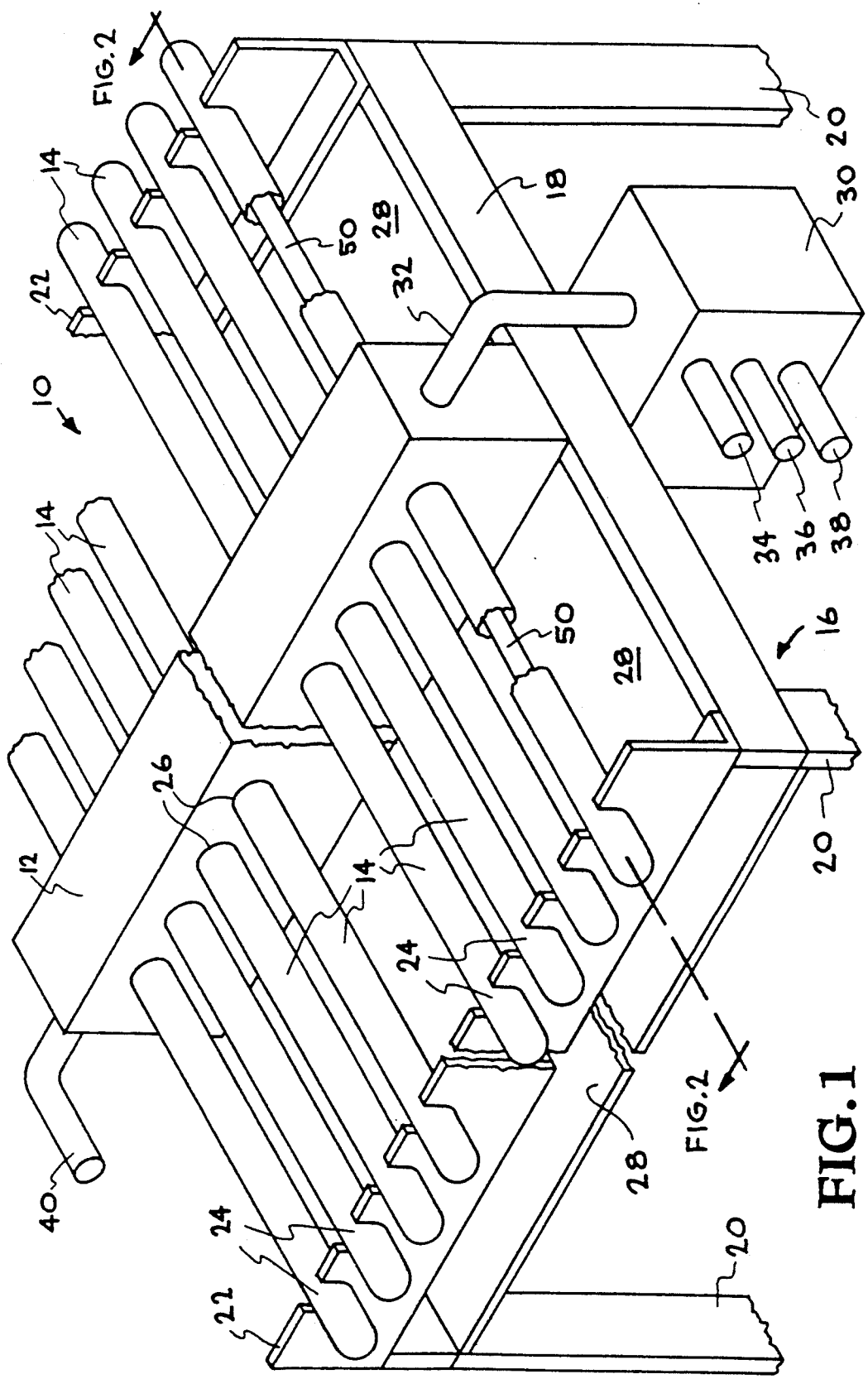
FIG. 1 is a perspective view of a solar powered water pump according to the invention, showing the solar collector array, manifold, and diaphragm pump.

As shown in FIG. 1, solar powered water pump 10 is formed of an elongated manifold 12 having a plurality of tubular solar collector elements (tubes) 14 extending therefrom in two spaced parallel arrays, one from each elongated side of manifold 12. Manifold 12 and tubes 14 are supported on a frame 16 which includes transverse support beams 18, which are connected to vertical support beams 20, and collector tube support beams 22 which have a plurality of U-shaped slots 24 for receiving the ends of tubes 14. Manifold 12 has a plurality of ports 26 through which tubes 14 are connected to the manifold. Frame 16 can also include a diffusely reflecting surface 28 mounted below the array of collector tubes 14. Diaphragm pump 30 is connected to manifold 12 through a steam inlet line 32 and is generally positioned below the manifold and collector array. Pump 30 also has a water inlet line 34 (from the water source), water outlet line 36, and steam outlet line 38. Condensate return line 40 also extends from manifold 12.

In operation the manifold 12 and array of collector tubes 14 mounted on the frame 16 are oriented in a direction and at an angle of inclination to optimize collection of solar energy at the latitude of installation. Vertical support beams 20 can be a simple stationary structure or a moveable structure which tracks the sun. Diffuse reflection from surface 28 increases collection efficiency. In a preferred embodiment the manifold is about 8' long and the solar collector array includes 39 collector tubes, arranged in two arrays of 20 and 19, but any suitable number can be used. The tubes have an outer diameter of 2.5" and are 6' long. The tubes are typically spaced apart by a tube diameter. Thus the array area is about 80 sq. ft.

Figure 2:
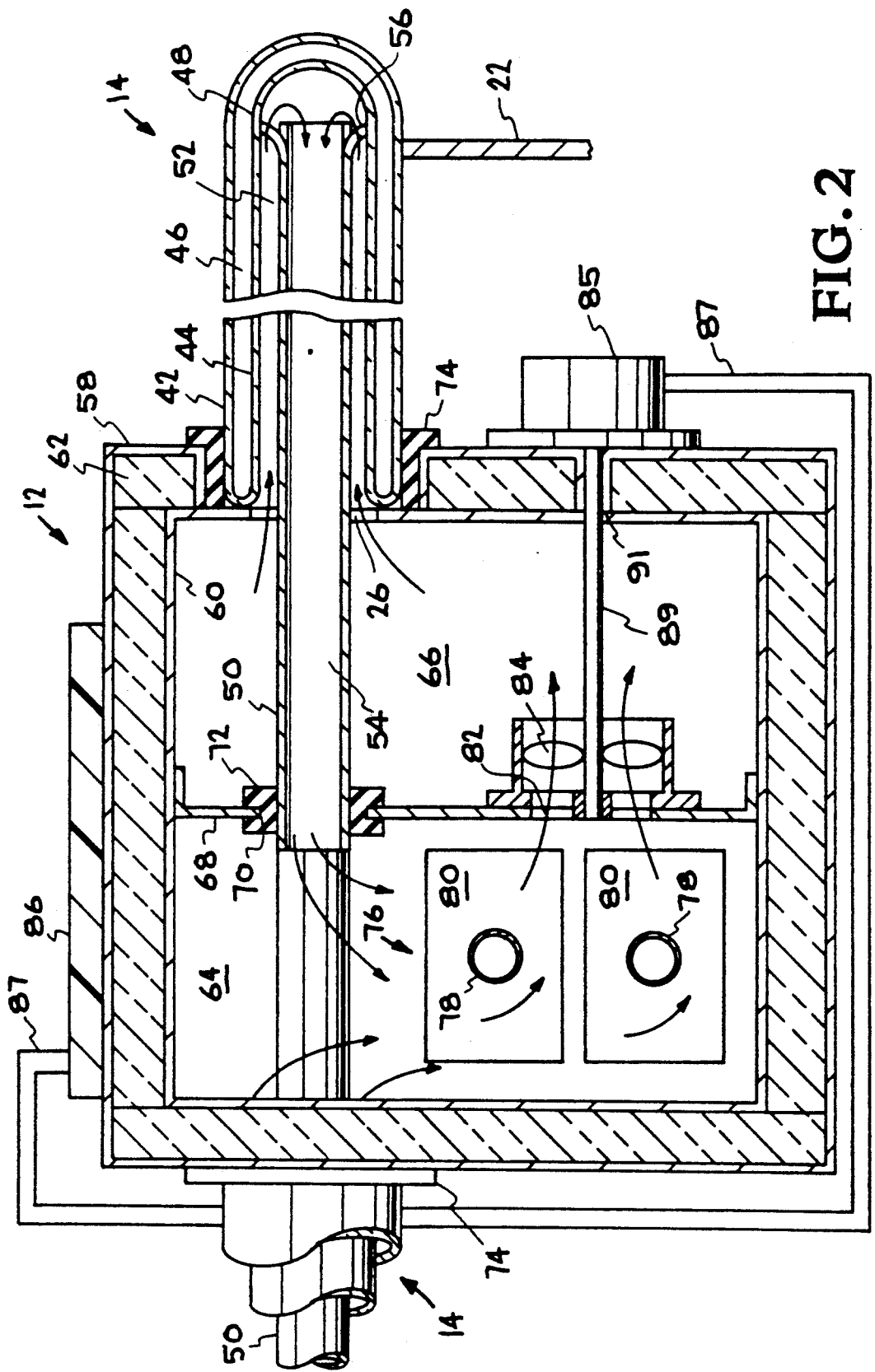
FIG. 2 is a cross-sectional view of the manifold and collector tubes taken along 2—2' of FIG. 1.

The design of the collector tubes, and the general design of the manifold, are as shown in U.S. Pat. No. 4,346,694 to Moan which is herein incorporated by reference. As shown in FIG. 2, collector tube 14 is made up of an outer wall 42 and a spaced inner wall 44 which define an annular space 46 therebetween which is evacuated to a deep vacuum, typically about $10^{-4}$ torr. Walls 42, 44 are typically glass. Inner wall 44 preferably has a solar energy absorbing surface 48 which is formed of a high absorption, low emission wavelength selective coating for the solar spectrum. A distributor tube 50, typically made of metal, is disposed coaxially in a spaced relation inside inner wall 44, defining a flow channel in the annular space 52 between the tube 50 and wall 44 and channel 54 inside tube 50. Tube 50 has a plurality of tabs or other spacing means 56 to maintain the tube in the coaxial position.

Manifold 12 is formed of an outer wall 58 and a spaced inner wall 60 with thermally insulating material 62 filling the space therebetween. Manifold 12 is generally rectangular in cross-section and is divided into two sections or chambers 64, 66 by a center partition 68. Each collector tube 14 communicates with both manifold sections 64, 66 and provides a flow path therebetween. One of the manifold sections is used as a supply or inlet section for a flow of cooler air into the collector tubes 14 while the other manifold section is used as an exhaust or outlet section for the flow of heated air from the collector tubes. As shown, section 66 is the inlet section and section, 64 is the outlet section. The center partition 68 contains a plurality of circular openings or ports 70, each of which receives the inner end of a distribution tube 50. Suitable sealing means 72 are used. The inner ends of collector tubes 50 fit into circular openings or ports 26 formed in the lateral walls of manifold 12, using suitable sealing means 74. In this manner, the flow channel 52 between the distributor tube 50 and collector tube inner wall 44 opens into the adjacent manifold section while the channel 54 inside distributor tube 50 opens into the opposite manifold section.

The outlet or "hot" section 64 of manifold 12 contains the internal heat exchange means 76 which includes at least one tube 78 which is filled with water and from which extend a plurality of perpendicular fins 80 like a radiator. The heated air flowing into the manifold section 64 passes over the fins 80 which absorb heat and transfer the heat to the water in tubes 78. The water in the heat exchanger 76 is thus heated to form steam which is the working fluid to operate the pump.

Figure 3A:
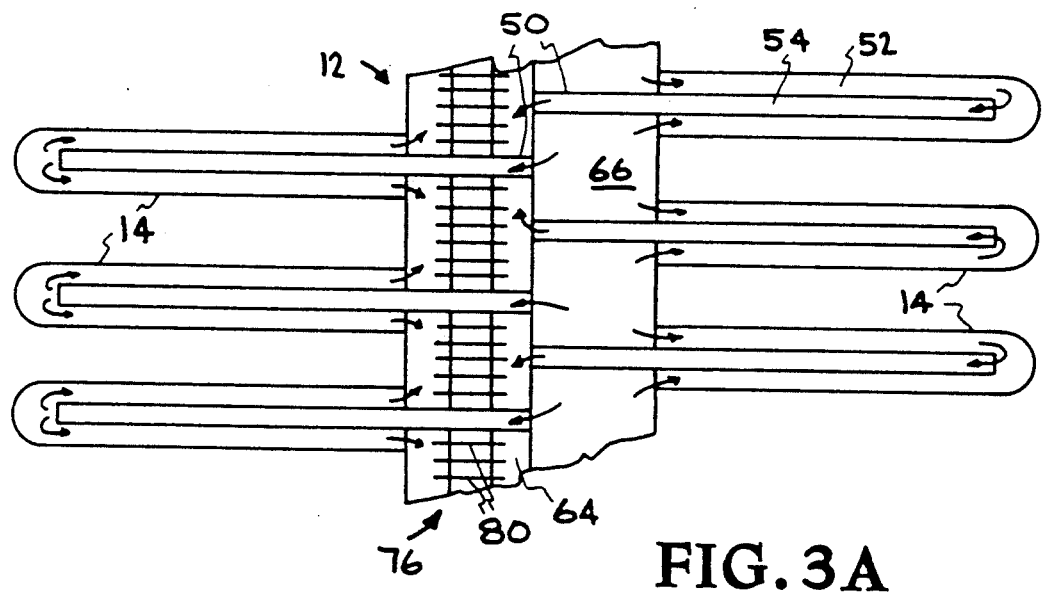
FIG. 3 A is a schematic view of air flow through the pumping system manifold (with heat exchanger) and solar collector tubes.

Air flow from the "cold" section 66 of the manifold, through the collection tubes 14, and into the "hot"

section 64 of the manifold is illustrated in FIG. 3A. For the tubes 14 extending from the manifold section 66 side, the air flow is out through channel 52 and back through channel 54 into manifold section 64. For the tubes 14 extending from the manifold section 64 side, the air flow is reversed, out through channel 54 and back through channel 52. In both cases, air (or other heat recovery medium) flows from the inlet section 66 through the solar collector tubes 14 where it is heated, and back to outlet section 64 where it contacts the fins 80 of heat exchange means 76. Heat from the air is transferred to the water (or other heat exchange fluid, such as freon) to produce steam (or other pressurized vaporized working fluid).

As shown in FIG. 2, the spent heated air in the outlet manifold section 64, after passing through the heat exchange means 76, is returned to the inlet manifold section 66 to be recycled. Center partition 68 contains an opening or air return port 82 through which the air flows. Circulation means such as fan 84 is mounted within the manifold, at port 82, to force the air flow. Fan 84 is driven by electric motor 85 through shaft 89. Electric motor 85 is mounted external to the manifold. Shaft 89 passes through opening 91 in the manifold wall which contains suitable means to maintain a seal with the rotating shaft. Motor 85 can be electrically connected to a photovoltaic (PV) panel 86, preferably mounted on the manifold, by means of electrical wires 87. The internal fan driven by a PV panel to push the air through the heating system is highly advantageous. When the light level is low, the PV output is low and the fan motor runs slower, reducing the air flow to allow better heating since the heating rate is also slower when the light is low.

Figure 3B:
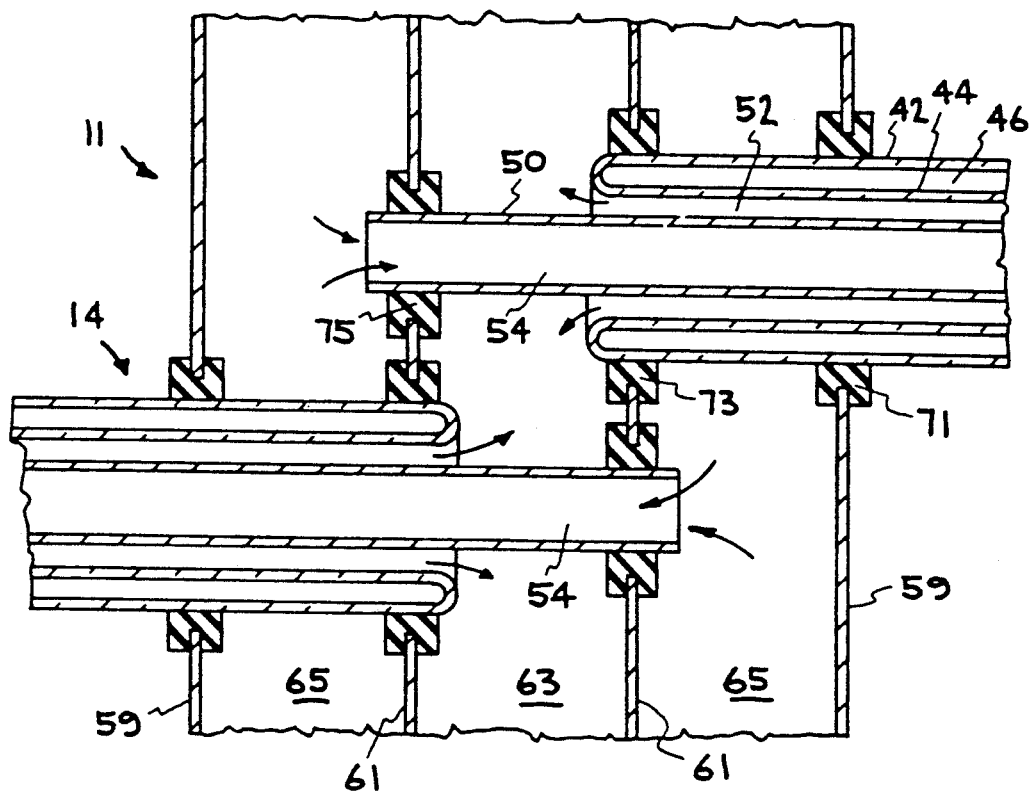

Alternative manifold designs can also be used, e.g. the three chamber design shown in FIG. 3B. Manifold 11 has lateral manifold walls 59 (which can be dual walls with insulation) and is divided into a longitudinal central "hot" chamber 63 and a pair of surrounding "cool" chambers 65 by a pair of partitions 61. The tubes 14 are as previously described. Walls 59 have openings 71 through which tubes 14 extend. The nearer partition 61 to the wall 59 from which a tube 14 extends has an opening 73 into which the end of tube 14 fits. The farther partition 61 has an opening 75 into which the end of distributor tube 50 fits. Air flow is from a cool chamber 65 through channel 54 in tube 50 and back through channel 52 into hot chamber 63.

Figure 4:
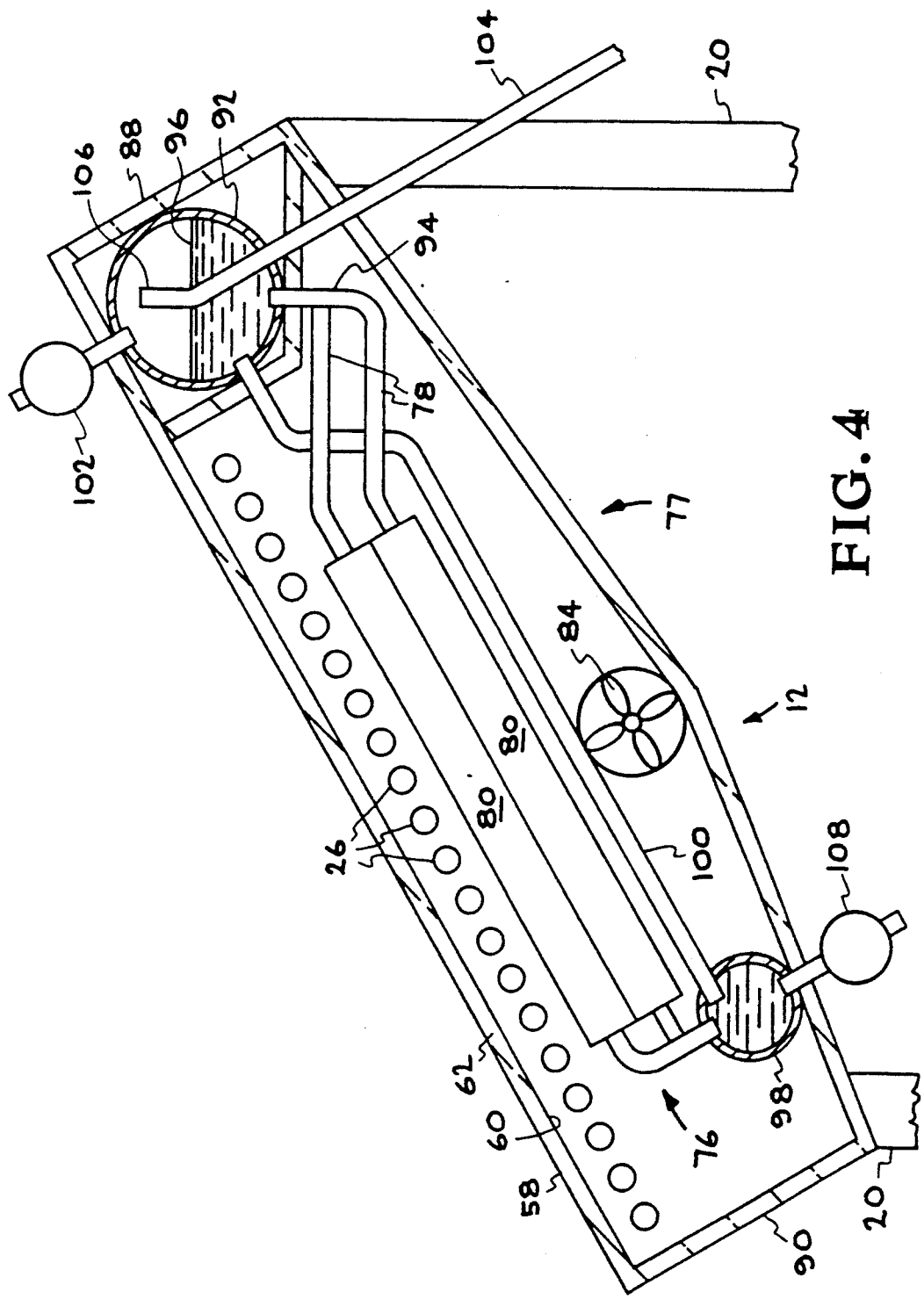
FIG. 4 is a cross-sectional view of an embodiment of the hot section of the manifold, showing the heat exchanger and recirculating fan, and steam drum and sump tank.

As shown in FIG. 4, a preferred embodiment of the manifold contains the steam generating means 77 internally within the manifold to produce a compact, rugged design. Manifold 12 has an outer wall 58 and inner wall 60 filled with insulation 62. Ports 26 are provided for the solar collector tubes. Heat exchange means 76 includes a pair of tubes 78, each of which is surrounded along a substantial portion of the length thereof by a block of thin metal fins 80 (which are represented as blocks rather than individual fins). In operation manifold 12 is installed in a tilted position, e.g. by means of vertical supports 20, with top end 88 higher than bottom end 90. Steam drum 92 is placed in manifold 12 at the top end 88, separated from the air inlet and exhaust chambers by suitable baffles. Steam drum 92 is connected to heat exchange tubes 78 by outlet pipe 94. In operation steam drum 92 is kept partially (about half) filled with water 96, and tubes 78 are filled with water. Steam drum 92 is typically cylindrical and by using appropriate bends in tubes 78, outlet pipe 94 can be positioned at the bottom of steam drum 92 (when manifold 12 is in its installed tilted position) so that water in steam drum 92 keeps tubes 78 filled. At the bottom end 90 of manifold 12 tubes 78 enter a sump tank (mud drum) 98, which is also filled with water. Another pipe (down comer) 100 extends between tank 98 and drum 92 to maintain water in tank 98 and tubes 78. In operation, as heated air enters manifold 12 (hot section) and flows over the blocks of fins 80, heat is absorbed by the fins. The steam generating means 77, including drum 92, heat exchange tubes 78, sump tank 98 and pipe 100 act as a boiler or percolator and heat the water in the tubes to generate steam which rises through tubes 78 and is collected in drum 92 above the level of the water 96. A fan 84 internally positioned in the manifold recirculates the air after giving up heat to the heat exchanger to reheat the air and continue generating steam. Manifold 12 as shown is deeper at the center portion than the ends to accomodate fan 84 but need not be so. A safety valve 102 is connected to steam drum 92; a pressure gauge could also be connected. Steam pipe 104 (line 32 of FIG. 1) extends from the steam drum 92 to deliver the steam to the pump. The end 106 of pipe 104 which extends into drum 92 is positioned above the level of water 96. Sump tank 98 also has a release valve 108. In an illustrative embodiment, the steam drum is 6" dia.×15" long, the sump tank is 3" dia.×6" long, and the down comer pipe is ¾" dia.

Figure 5C:
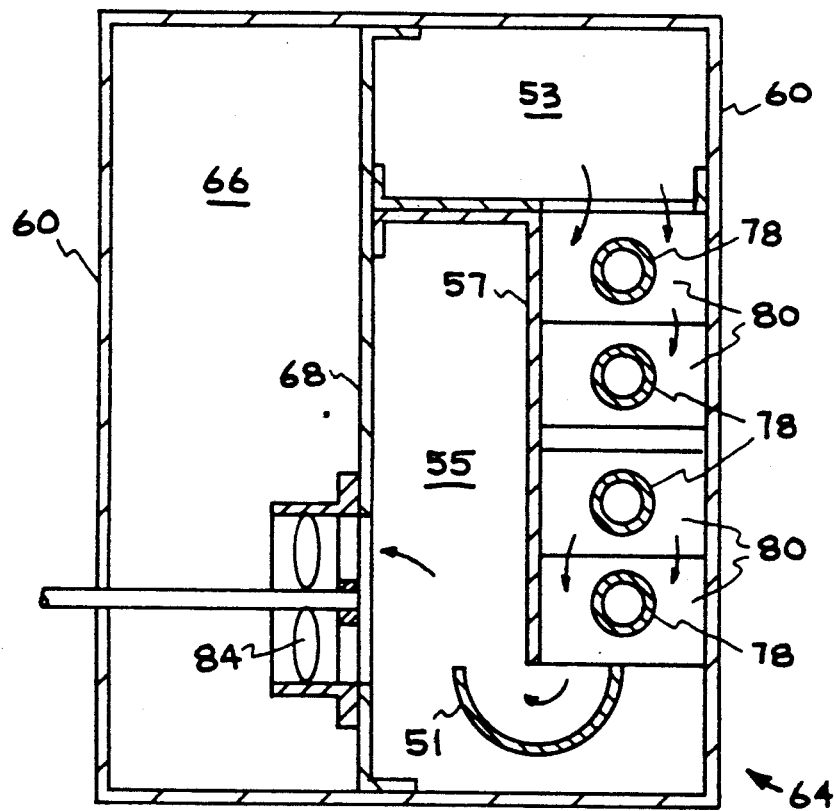
FIGS. 5 A, B, C are a longitudinal cross sectional view, a top plan view, and a transverse cross sectional view, respectively, of an alternative embodiment of the heat exchanger in the manifold, with steam drum and sump tank, and air flow deflectors.

Although two heat exchange tubes 78, as shown in FIG. 4, or even a single tube could be used, it is desirable to provide as much water as possible with as much surface contact to the heat exchanger fins, to maximize heat transfer efficiency and steam production. As shown in FIGS. 5 A and B, heat exchanger 76 utilizes four tubes 78 which are interconnected by suitable fittings 110 and connected to steam drum 92 by a pair of pipes 112. The remainder of the system, including fins 80, sump tank 98, down comer pipe 100 and steam pipe 104, is similar to that of FIG. 4. Drum 92 has a fill port 93. Heat exchanger 76 abuts wall 60 of the manifold.

The hot chamber 64 of the manifold may be configured to improve airflow, as shown in FIG. 5 C. Partition 68 separates chamber 64 from cool chamber 66. A stack of four tubes 78 with associated fins 80 is mounted in chamber 64 along manifold wall 60. Inverted L-shaped flow guiding baffle 57 divides the chamber 64 into a first plenum region 53 over the tube/fin structure and a second plenum region 55 adjacent to the partition 68. Region 53 receives hot air from the collector tubes and directs air flow down through the fins 80. A curved deflector 51 below the fins deflects the air back up and into region 55 from which it is drawn by the fan into the cold side 66 of the manifold as previously described.

In an illustrative embodiment of the manifold of FIGS. 5 A-C, the manifold chambers are 13" high×8½" wide with the hot chamber 5" wide and the cool chamber 3½" wide. The fins are 2¾" wide×1⅞" high; the length of each tube covered by fins is 5'.

Figure 6:
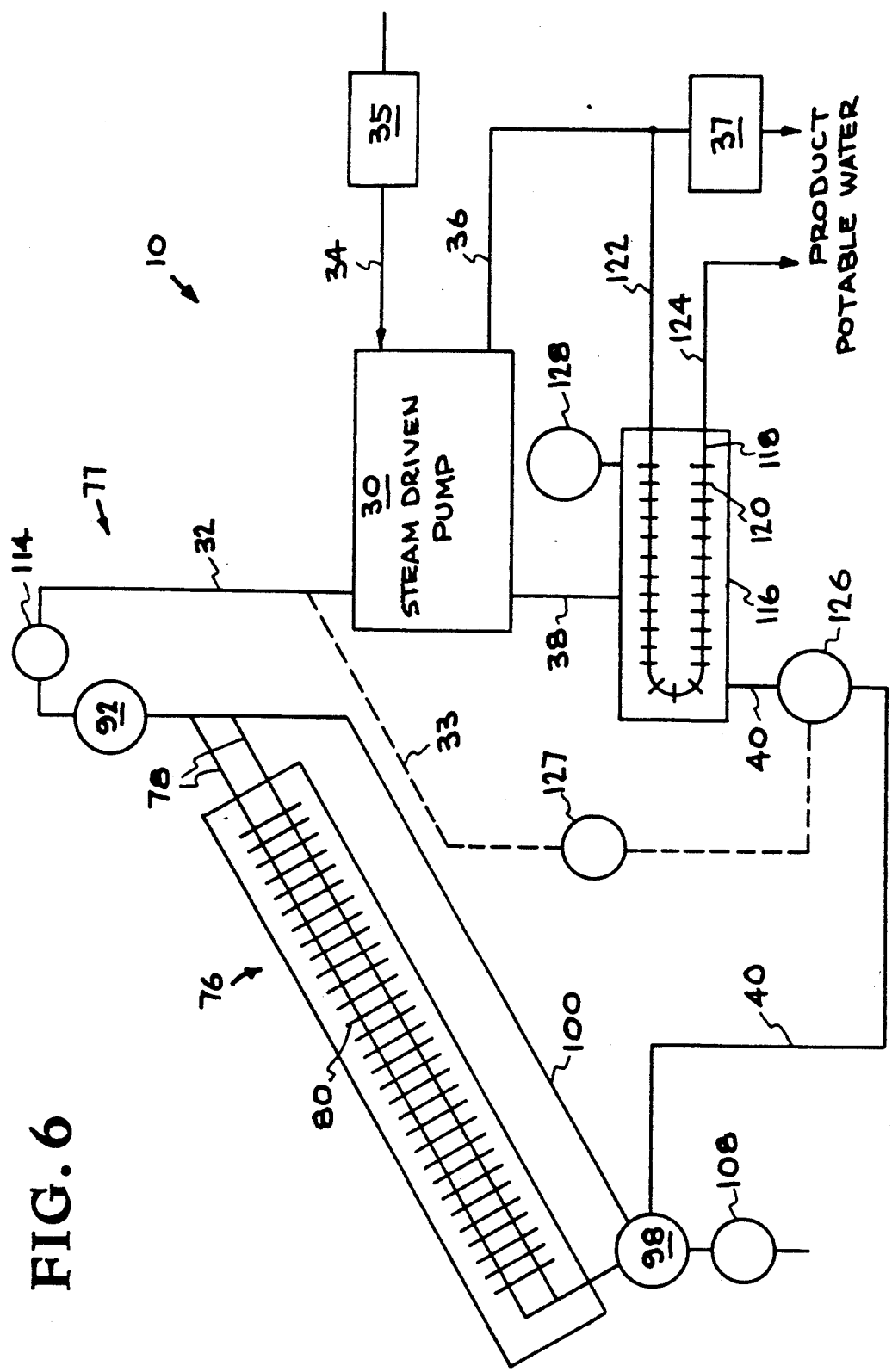
FIG. 6 is a schematic view of the pumping system with heat exchanger, pump, condenser, steam lines, and water lines.

The heat exchanger is interconnected to the pump as shown schematically in FIG. 6. Steam from steam drum 92 is inlet through steam line 32 into steam driven pump 30. Valve 114 in steam line 32 controls the steam flow. Heat exchanger 76, which includes tubes 78 and fins 80, operates in combination with steam drum 92, sump tank 98 and down comer pipe 100 to form steam generation means 77 to generate the steam, as previously described. Steam driven pump 30 is preferably a double diaphragm pump, e.g. as described in *The Chemical Engineer*, Dec.

13, 1990, pp. 34–38, which is herein incorporated by reference, but can be any other type of suitable steam driven pump. When actuated by steam through steam line 32, pump 30 draws water from the water source into the pump 30 through water inlet line 34 and pumps the water out through water outlet line 36. The steam is exhausted from pump 30 through steam outlet line 38 into a condenser 116, typically 6" dia. ×20" long, where the steam is converted back to water. Condenser 116 may include a cooling tube 118 surrounded by metal fins 120. Cooling water, e.g. some of the water from the pump 30, is input into condenser 116 through cooling water inlet line 122 and removed through cooling water outlet line 124. The water from condenser 116 is returned to sump tank 98 through condensate return line 40 by means of condensate transfer pump 126, which can be a steam powered jet injector. Condenser 116 is also connected to vacuum pump 128 to exhaust system air prior to operation. Pump 128 can be powered by a PV panel or the system can be evacuated and sealed prior to shipment.

If the water from the source is not sufficiently pure, or if it is desired to otherwise treat the water, ancillary treatment units can be used in combination with the solar powered water pump. Treatment units 35, 37 can be connected to inlet and/or outlet water lines 34, 36, respectively. Treatment units 35, 37 may be simply filters or more complex active water treatment devices.

In operation the drum reaches a pressure of 18–20 psig (33–35 psia) and stabilizes at 15–18 psig. The condenser is at a pressure of −13 psig (2 psia) so the pump sees a pressure drop of about 30 psi. The optimum operating temperature of the hot air is about 295° F. and of the steam is about 255° F.

Figure 7:
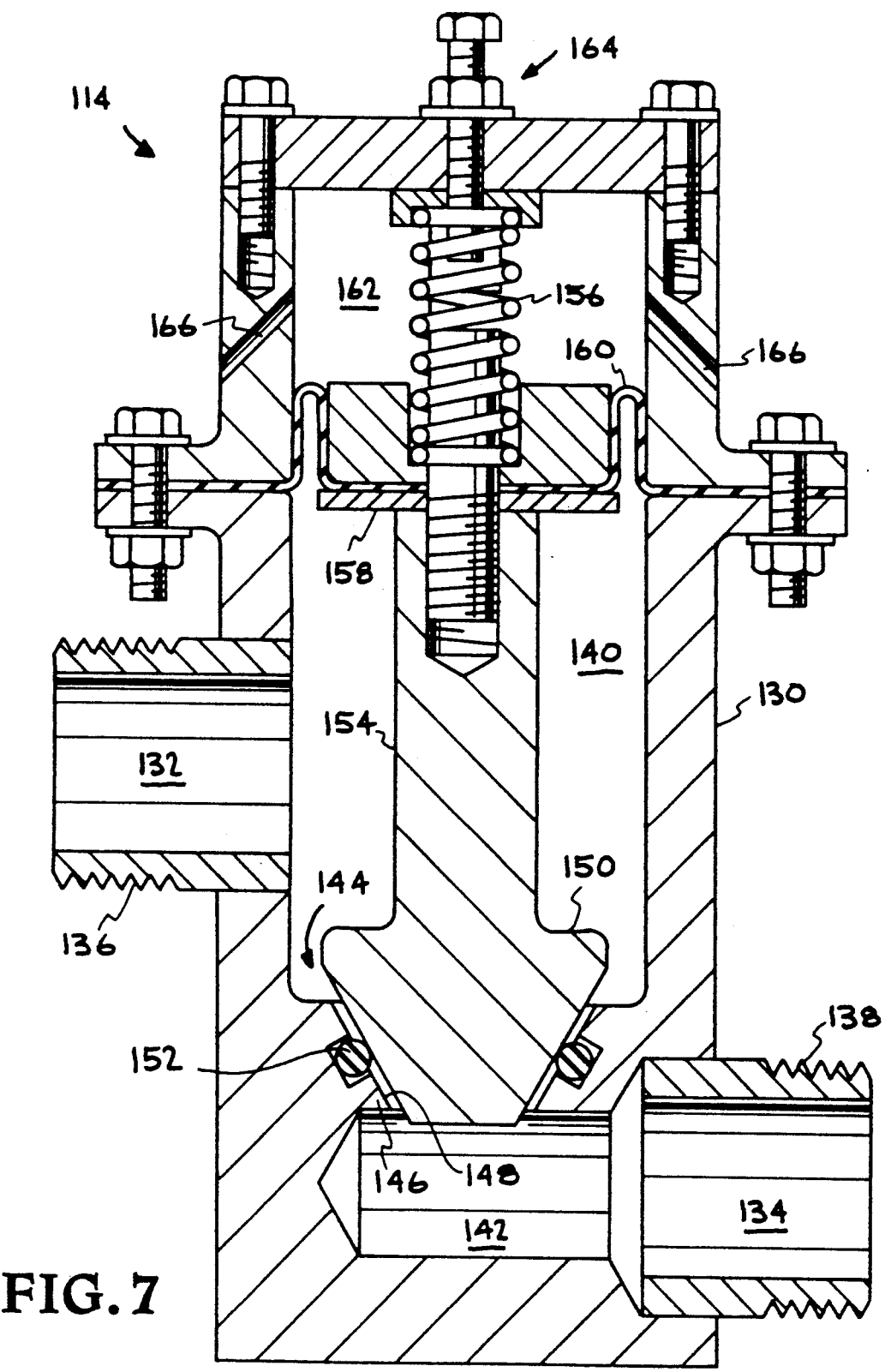
FIG. 7 is a cross-sectional view of an automatic steam valve for controlling steam flow to the pump.

An automatic steam valve 114, as shown in FIG. 7, is placed in the steam line from the steam drum to the pump to control steam flow and regulate pump operation. Valve 114 has a valve body 130, typically cylindrical and made of brass, with an inlet port 132 and steam outlet port 134. Valve 114 is connected to the steam line using suitable fittings 136, 138 at the ports 132, 134 respectively. Inlet port 132 communicates with intake chamber 140 while outlet port 134 communicates with discharge chamber 142.

A valve seal 144 between the intake and discharge chambers 140, 142 is formed by a flange 146 having a conical aperture 148 therein and a moveable conical piston 150 which mates with aperture 148. O-ring 152 is placed in aperture 148 to provide a better seal. Piston 150 is connected to one end of valve stem 154 which is connected at its other end to one end of spring 156 which is connected at its other end to the valve body. A plate (washer) 158 is mounted between the spring 156 and valve stem 154, and a rolling seal 160 is formed between plate 158 and the valve body 130. Plate 158 and rolling seal 160 separate intake chamber 140 from spring chamber 162.

In the closed position, spring 156 forces piston 150 into aperture 146. Spring tension can be adjusted by spring tension adjustment means 164 to control the pressure at which the valve opens. As steam enters the intake chamber 140 with the valve closed, the steam exerts pressure against spring 156 through plate 158. When the steam pressure is sufficient to compress the spring 156, piston 150 is retracted from aperture 146 and the steam flows into discharge chamber 142 and out through port 134. Rolling seal 160 allows plate 158 to translate within valve body 130 and prevents steam from passing into spring chamber 162. Valve body 130 contains vent holes 166 which communicate with spring chamber 162 to allow air to maintain ambient pressure in the spring chamber. When the spring is properly tensioned, the valve will open when the steam is at operating pressure and will close when the steam drops in pressure to allow pressure to build back up again. Thus the pump operates as long as the sun supports operation; when the sun cannot support operation the valve closes.

Figure 8:
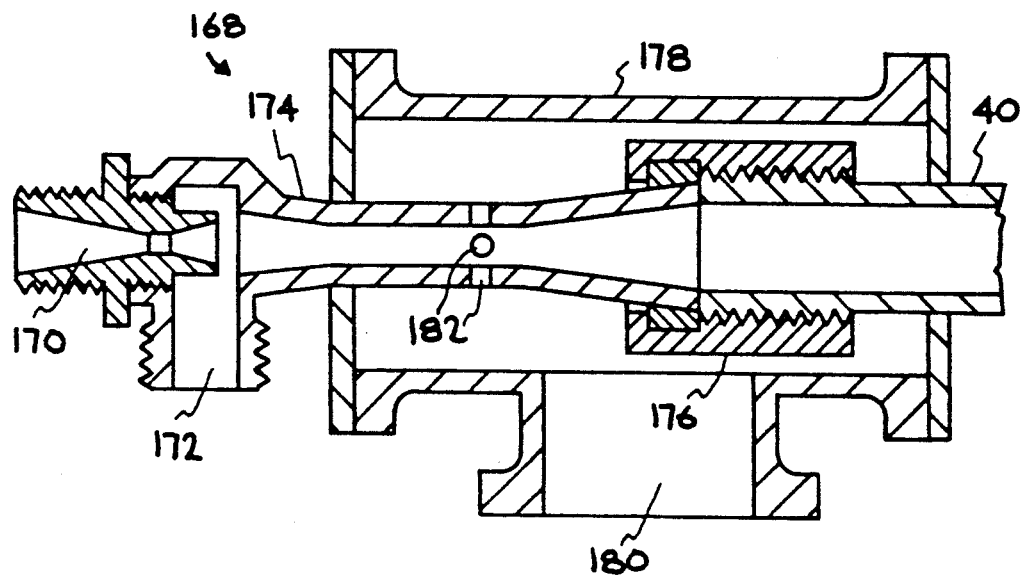
FIG. 8 is a cross-sectional view of a solar pump injector for pumping condensate from the condenser.

A steam driven solar pump injector 168, shown in FIG. 8, can be used as the condensate transfer pump 126 of FIG. 6 to return water to the steam generating means 77. As shown in FIG. 6 pump 126 can be connected through valve 127 to branch steam line 33 which extends from steam line 32. Valve 127 is used to limit the amount of time that the pump 126 operates so as to not waste valuable steam which should be used primarily to drive pump 30. Pump 126 need only operate two or three times an hour for less than two minutes each time to prevent excess water from accumulating in the condenser 116 and to maintain water level in steam generating means 77.

As shown in FIG. 8, injector 168 has a venturi tube 170 which is connected to a steam line (line 33) and which extends into one end of injector body 174. Inlet port 172 at the same end of injector body 174 is connected to the output of the condenser (line 40). As steam passes through venturi tube 170, the pressure drop produces suction which draws water from the condenser into injector body 174, which is also a venturi tube. The other end of injector body 174 is connected to return line 40 by coupling 176. Part of injector body 174 is enclosed in an overflow chamber 178 which has an outlet port 180. A plurality of holes 182 in injector body 174 allow excess water to pass into chamber 178 from where it passes back to the condenser through port 180 which is connected to the condenser. A one-way check valve can be included between port 180 and the condenser.

Although the invention has been described using water as the heat exchange medium to produce steam as the working fluid to drive the pump, other fluids could similarly be used. In particular, freons are a class of polyhalogenated derivatives of methane and ethane which contain fluorine, and in most cases chlorine or bromine. Freons have low boiling point and are widely used as refrigerants. A very efficient solar powered water pump can be designed using freon, since it is easy to vaporize and pressurize for use as the working fluid to drive the pump. However, because of the environmental concerns about freon, water is preferred. Other gaseous working fluids such as ammonia vapor could also be used.

Changes and modifications in the specifically described embodiments can be carried out without departing from the scope of the invention which is intended to be limited only by the scope of the appended claims.

We claim:

1. A solar powered water pumping apparatus, comprising:
    an elongated manifold having a pair of lateral sides;
    a partition dividing the manifold longitudinally into a gas inlet chamber and a gas outlet chamber;
    a gas return port formed in the partition;
    a plurality of vacuum insulated glass solar collector tubes extending from the lateral sides of the manifold in a spaced staggered array, each tube defining a gas flow channel therethrough with one end communicating with the gas inlet chamber and the other end communicating with the gas outlet chamber;

a gas comprising air filling the manifold chambers and tube channels;

gas circulation means mounted in the manifold for flowing gas from the inlet chamber through the tube channels to the outlet chamber and from the outlet chamber through the gas return port to the inlet chamber;

heat exchange means positioned in the gas outlet chamber so that heated gas from the collector tube channels flows over the heat exchange means, the heat exchange means comprising at least one heat exchange tube and a plurality of spaced parallel fins extending from each tube;

supply and collection means mounted in the manifold and connected to the heat exchange means for supplying a heat exchange fluid comprising water to the heat exchanger and collecting a gaseous pressurized working fluid comprising steam from the heat exchange means produced by heating the heat exchange fluid, the supply and collection means comprising a steam drum connected to one end of each of the heat exchange tubes and elevated vertically higher than the heat exchange tubes for collecting steam, a sump tank connected to the other end of each heat exchange tube and vertically below the heat exchange tubes, and a down comer pipe from the steam drum to the sump tank, the steam drum being partly filled with water and each heat exchange tube, the sump tank and down comer pipe being totally filled with water;

a valve connected to the supply and collection means to control outlet of the working fluid;

pump means driven by the working fluid connected to the supply and collection means through the valve;

a condenser connected to the pumping means for receiving the working fluid after passing through the pumping means to convert the working fluid back to heat exchange fluid;

condensate return means for returning the condensed working fluid to the supply and collection means.

2. The apparatus of claim 1 further comprising support means on which the manifold and tube array are mounted for orienting the tube array toward the sun.

3. The apparatus of claim 1 wherein the manifold comprises an outer wall and a spaced inner wall with insulation therebetween.

4. The apparatus of claim 1 wherein the solar collector tubes each comprise a double walled glass tube with an evacuated space therebetween and a light absorbing coating on the inner wall thereof, and a metal tube coaxially disposed within the glass tube, the gas flow channel extending between the glass tube and metal tube and inside the metal tube, the manifold having a plurality of ports for receiving an end of each glass tube and the partition having a plurality of ports for receiving an end of each metal tube.

5. The apparatus of claim 1 wherein the gas circulation means comprises a fan, and further comprising a photovoltaic panel mounted on an upper surface of the manifold and electrically connected to the fan to power the fan.

6. The apparatus of claim 1 wherein the pumping means is a double diaphragm pump.

7. The apparatus of claim 1 wherein the valve is an automatic valve which opens when the steam in the drum reaches a predetermined operating pressure and closes when the steam pressure decreases below the operating pressure.

8. The apparatus of claim 1 wherein the condenser return means comprises a jet injector having a first inlet connected to the steam drum, a second inlet connected to the condenser, and an outlet connected to the sump tank.

9. The apparatus of claim 1 further comprising water treatment means connected to at least one of the pumping means water inlet or outlet.

10. The apparatus of claim 1 comprising four heat exchange tubes stacked vertically and air flow guiding means mounted within the gas outlet chamber to direct air flow over the fins.

* * * * *